(12) United States Patent
De Coi

(10) Patent No.: US 10,502,625 B2
(45) Date of Patent: Dec. 10, 2019

(54) SPECTROMETER AND METHOD FOR ADJUSTING A FILTER ARRAY

(71) Applicant: ESPROS Photonics AG, Sargans (CH)

(72) Inventor: Beat De Coi, Maienfeld (CH)

(73) Assignee: Espros Photonics AG, Sargans (CH)

(*) Notice: Subject to any disclaimer, the term of this patent is extended or adjusted under 35 U.S.C. 154(b) by 143 days.

(21) Appl. No.: 15/802,993

(22) Filed: Nov. 3, 2017

(65) Prior Publication Data

US 2018/0143075 A1 May 24, 2018

(30) Foreign Application Priority Data

Nov. 18, 2016 (EP) .................................. 16 199 476

(51) Int. Cl.
| | |
|---|---|
| G01J 3/45 | (2006.01) |
| G01J 3/28 | (2006.01) |
| G01J 3/26 | (2006.01) |
| G01J 3/36 | (2006.01) |
| G01J 3/12 | (2006.01) |

(52) U.S. Cl.
CPC . *G01J 3/45* (2013.01); *G01J 3/26* (2013.01); *G01J 3/2803* (2013.01); *G01J 3/36* (2013.01); G01J 2003/1221 (2013.01); G01J 2003/1239 (2013.01)

(58) Field of Classification Search
CPC .... G01J 3/26; G01J 3/2803; G01J 2003/2806; G01J 3/45
USPC ................................. 250/226; 359/885, 890
See application file for complete search history.

(56) References Cited

U.S. PATENT DOCUMENTS

| | | |
|---|---|---|
| 5,144,498 A | 9/1992 | Vincent |
| 5,159,199 A | 10/1992 | LaBaw |
| 9,304,039 B2 * | 4/2016 | Tack ......................... G01J 3/26 |
| 2015/0153224 A1 | 6/2015 | Shibayama et al. |

FOREIGN PATENT DOCUMENTS

| | | |
|---|---|---|
| DE | 11 2013 002 556 T5 | 1/2015 |
| EP | 0 442 738 A2 | 8/1991 |

OTHER PUBLICATIONS

Extended European Search Report (Application No. 16199476.9) dated Jul. 31, 2017.

* cited by examiner

*Primary Examiner* — Kevin K Pyo
(74) *Attorney, Agent, or Firm* — Burr & Brown, PLLC

(57) ABSTRACT

Spectrometer for recording a spectrum, in particular in a wavelength range of 250 nm to 1150 nm, comprising: a sensor array and a filter array for filtering the radiation depending on the wavelength, wherein, in order to reduce production costs, provision is made of a device for identifying the sensor pixels covered by the filter array, having a nonvolatile memory in which the coordinates of the filter array in relation to the sensor array and/or the coordinate transformation of the filter array in relation to the sensor array are/is stored in order to assign the sensor pixels to the individual filter pixels on the basis of the stored coordinates and/or coordinate transformation and/or in order to activate the individual filter pixels depending on which of the sensor pixels are covered by the corresponding filter pixels.

22 Claims, 2 Drawing Sheets

SPECTROMETER AND METHOD FOR ADJUSTING A FILTER ARRAY

This application claims the benefit under 35 USC § 119(a)-(d) of European Application No. 16 199 476 filed Nov. 18, 2016, the entirety of which is incorporated herein by reference.

FIELD OF THE INVENTION

The present invention relates to a spectrometer for recording a spectrum, in particular, in a wavelength range of 250 nm to 1150 nm, and a method for adjusting a filter array in relation to a sensor array for a spectrometer and/or for producing a spectrometer.

BACKGROUND OF THE INVENTION

Spectrometers having a sensor pixel array and an assigned filter are known from the prior art. The filters used are composed of individual filter pixels, wherein e.g. Fabry-Pérot interferometers are used for forming a bandpass filter.

SUMMARY OF THE INVENTION

It is an object of the present invention to provide a spectrometer whose production costs are significantly reduced.

In the case of the spectrometer according to the present invention, the object can be achieved, in particular, by virtue of the fact that the adjustment between the sensor array and the filter array is significantly simplified and, respectively, causes lower costs in production. At the same time, in principle, no accuracy is forfeited in the case of the spectrometer according to the present invention and, respectively, the adjusting method according to the present invention. A semiconductor chip is situated on the front side of the spectrometer, on which semiconductor chip in particular the electronics serve for capturing and/or processing the detected signals supplied by the sensor array. The sensor array, in turn, by means of which the light signals to be received can be detected, is designed for rear-side illumination and in this respect is advantageously arranged on the rear side of the semiconductor chip, such that the electronics of the semiconductor chip face away from and do not shade the detection side. The sensor array comprises a matrix arrangement of at least two sensor pixels. In general, however, significantly more than two sensor pixels are present. Generally, the sensor pixels serve for detecting electromagnetic radiation, that is to say, in particular, light in the abovementioned wavelength range of between 250 nm (abbreviation: nanometers) and 1150 nm. By virtue of the fact that the sensor array is designed for rear-side illumination, advantageously more detection area is usually available since, as already explained above, possible evaluation electronics do not shade the detection region.

Furthermore, the rear-side illumination additionally also has the advantage that it is not necessary to use an insulation layer, which generally has an (albeit only slightly) altered refractive index and can thus lead to reflections. The incident light to be detected can be absorbed well since practically the entire bulk material and hence a comparatively thick absorption layer is available; this is also advantageous, in particular, because different wavelengths have different penetration depths into the bulk material. The rear-side exposure of the sensor enables a very high sensitivity over a very wide wavelength range. In addition, the profile of the sensitivity in the wavelength range, in particular, between 250 nm to 1150 nm, is very homogeneous and practically without modulation.

Furthermore, provision is made of a filter array for filtering the radiation depending on the wavelength, wherein the filter array comprises a matrix arrangement of at least two filter pixels. Each filter pixel can be assigned to a specific region on the sensor array, such that light which passes through a corresponding filter pixel is incident on the assigned region of the sensor array and is detected there by the corresponding sensor pixels. Each of the filter pixels for the purpose of filtering forms as it were a Fabry-Pérot interferometer. A Fabry-Pérot interferometer comprises e.g. two semitransparent mirrors or end sections of a transparent plate, which are arranged in as parallel a manner as possible. The light can thus pass directly through the interferometer, or it is reflected between the two semitransparent mirrors or the interfaces of the corresponding glass plate, that is to say in each case travels once again double the distance between the mirrors or double the thickness of the glass plate or a multiple thereof. In the case of the interfering beams, this results in a path difference which, therefore, depending on the distance between the semitransparent mirrors or the thickness of the glass plate, leads to the corresponding interference effect and transmits the light in a wavelength-dependent manner. Since a rear-side illumination is provided, the filter array is arranged toward the rear side of the sensor array.

In order to be able to simplify the adjustment between filter array and sensor array, the present invention provides a device for identifying the sensor pixels covered by the filter array, comprising a nonvolatile memory, wherein the coordinates of the filter array in relation to the sensor array are stored in the memory; instead of the direct coordinates, a coordinate transformation of the filter array in relation to the sensor array can also be stored in the memory. On the basis of the coordinates and/or the coordinate transformation, the sensor pixels can be assigned to the individual filter pixels. If a sensor pixel is not covered by a filter pixel, then accordingly no assignment takes place. This information about the relative positioning of sensor array and filter array makes obsolete, during the positioning of the two with respect to one another, the need to take care accurately to ensure that a corresponding filter pixel lies accurately above the sensor pixels provided therefor. It is simpler instead if, during the fitting of the filter arrays at the sensor array, it is essentially unimportant how accurately the filter array is aligned relative to the sensor, which sensor pixels specifically are then actually covered and whether the filter array is positioned in a manner displaced or rotated relative to the sensor array. The adjustment itself, particularly during the production of such spectrometers, actually constitutes a particularly expensive method step since the filter pixel has to be adjusted and moved relative to the sensor array very exactly and with huge technical complexity. The present invention additionally makes it possible that the sensor array need not be calibrated anew for each filter.

In one development of the present invention, there is then the possibility of arranging the filter array on the rear side of the sensor array. As an alternative thereto, the filter array can also be applied on a transparent carrier, wherein the transparent carrier can in turn be arranged on the rear side of the sensor array. If a transparent carrier is omitted, then particularly accurate and cost-effective manufacture is possible since the filter array is positioned directly in relation to the sensor array during production.

The filter array can also be applied on a transparent carrier, wherein the transparent carrier in turn is arranged on the rear side of the sensor array. Such an exemplary embodiment has the advantage that both sensor array and filter array can be manufactured separately. Furthermore, the sensor array to be illuminated from the rear side should generally be treated in a sensitive manner, such that a direct, fixed connection to a filter layer might bring about stresses and thus possibly results in destruction. In the case of the exemplary embodiment of the present invention under discussion, this can be avoided by the filter array being manufactured on such a transparent carrier.

In one development of the present invention, an appropriate transparent carrier is a glass sheet, in particular, since such a material can be equipped with the desired optical properties, in particular with a high transparency, but also with the requisite stability for the filter. If optical components such as sensor array and filter array are produced separately from one another, then they must be adjusted relative to one another later during the assembly of the spectrometer. A transparent carrier can therefore be used in an advantageous manner for the handling of the filter array.

In principle, according to the present invention, the device for identifying the sensor pixels covered by the filter array enables the assignment of which filter pixels cover which sensor pixels, such that the wavelength filtered out can also be assigned to the corresponding sensor pixels. According to the present invention, this is generally possible, however, even if filter array and sensor array are rotated with respect to one another, i.e. if rows and/or columns of the respective arrays do not run parallel to one another. Furthermore, it must be taken into consideration that coverage of the filtered light can occur in the edge regions of individual filter pixels. This possibly has the consequence that here in the edge regions of individual filter pixels the detection cannot be performed with the corresponding precision because an unambiguous assignment of an intensity to a specific wavelength is no longer straightforwardly possible. In order to avoid this, it is possible to use, in particular, a perforated grid diaphragm. Such a diaphragm prevents a detection in the edge regions of the individual filter pixels in which overlaps with light of adjacent filter pixels are to be expected anyway. However, the perforated grid diaphragm overall defines simultaneously individual detection regions which each comprise at least one sensor pixel and can be assigned to a specific filter pixel, i.e. are responsible for the detection of a specific wavelength range. In one embodiment of the present invention, the accuracy of the measurement can advantageously be increased by the design of such a perforated grid diaphragm.

In order to be able to produce the perforated grid diaphragm as cost-effectively as possible and without relatively high material outlay and/or manufacturing complexity, individual sensor pixels in the edge regions of the filter pixels can be deactivated, that is to say that either they are switched off from the outset or their measurement signal is not taken into account any further. Applying or incorporating a perforated grid diaphragm onto the sensor array or onto and/or into the filter array can thus be avoided, and overlaps as a result of the arrangement of adjacent filter pixels are thus nevertheless taken into account.

Conversely, it is also conceivable that, in the embodiment variant of the present invention, by means of the device for identifying the sensor pixels covered by the filter array, precisely those (or some of those) sensor pixels are first activated if they lie in superimposition with the respective filter pixels and possibly additionally fall within that region of the perforation grid diaphragm which is not intended to consist of inactive pixels, since the latter can lie too much in the edge region of the individual filter pixels and therefore lead to inaccuracies. It is thus also possible to leave the corresponding sensor pixels inactive until they can be assigned in accordance with the arrangement of the filter array, and then first to activate them. Incorrect detections and/or inaccuracies can be avoided as a result. If appropriate, the energy demand of the spectrometer can also be reduced by this measure, since only specific sensor pixels are activated in a targeted manner.

For this purpose of being able to activate or deactivate sensor pixels in accordance with the position of the filter array, the device for identifying the sensor pixels covered by the filter array, in accordance with one exemplary embodiment of the present invention, have a corresponding electronic circuit. This enables the assignment of the sensor pixels to the filter array to be carried out automatically during the operation of the spectrometer. This can, if appropriate, also be performed solely at the data processing level. A pure selection of the data supplied by individual sensor pixels at the data processing level has the advantage that more measurement data are available in principle. The measurement data then need only be evaluated subsequently. If, for example, the measurement data present in the edge region of the filter pixels are of interest, then these can still be used. By way of example, on the basis of the data, it is also possible to determine with what width the edge of a perforated grid diaphragm ought to be chosen. The electronic circuit can also be responsible, in one embodiment of the present invention, for implementing the perforated grid diaphragm to the effect that it deactivates sensor pixels in the edge region of the respective filter pixels.

In the development of the present invention, the electronic circuit can be, in particular, part of the semiconductor chip. In this way, the electronic circuit can be implemented compactly in the spectrometer and be an integral part of the spectrometer.

In particular, the electronic circuit can advantageously be fitted on the front side of the semiconductor chip, such that it, too, does not contribute to the shading of the detection region during rear-side illumination.

As already described above, the electronic circuit can be designed not to read the deactivated sensor pixels in the first place, because it is assumed that the latter can yield corrupted measurement data on account of possible overlaps. For manufacturing reasons, too, it may be simpler to activate the totality of the sensor pixels during operation, that is to say to cause them to be detected, since the accurate position of the filter array is initially not known in general and is only determined later by ascertaining the relative coordinates of the filter array and/or the coordinate transformation between sensor array and filter array, while the associated assignment is in turn performed only by the electronics and/or software.

In one particularly advantageous embodiment of the present invention, the filter pixels have a larger area than the sensor pixels. In this way, a plurality or a multiplicity of sensor pixels can be assigned to a filter pixel, that is to say, that for the filtered-out wavelength a single sensor pixel is not available for detection. The sensitivity and the accuracy of the sensor are improved thereby. Preferably, the area of the filter pixel is 16 times larger than the area of a sensor pixel. However, in particular ranges of between an area approximately three times larger and an area approximately 100 000 times larger are conceivable here. On the one hand, smaller sensor pixels can generally operate faster than large sensor pixels. On the other hand, it should be taken into consideration that at least when sensor array and filter array are intended to be produced on one wafer, this production process is generally very expensive owing to the filter array implemented. For this reason, it is often preferred to produce the filter array separately. Precisely, in this case, it is necessary, however, to adjust the filter array in relation to the sensor array, which is correspondingly made possible in a particularly good way by the present invention and, in particular, in accordance with this exemplary embodiment.

In an advantageous manner, however, the filter array in its entirety can in turn cover a smaller area than the sensor array. What can be ensured in this way is that the entire region of the filter array is captured by sensor pixels or by the sensor array, wherein, in particular for adjustment purposes, there is still latitude as to where exactly the filter array is fitted on the sensor array. In particular, at the outer edge of the filter array, upon the fitting thereof on the sensor array, some space can still be left such that this region also does not bear directly at the edge of the sensor array, with the result that a sufficiently reliable detection of the corresponding electromagnetic radiation can be carried out.

The filter used can be designed in various ways, in principle. For the design of a Fabry-Pérot interferometer, each filter pixel can have, for example, an arrangement of partly transmissive mirrors which run parallel to one another and which are separated from one another by a transparent layer. What is also made possible in this way is that the filter array can have pixels lying directly alongside one another. In this case, the filter array can be constructed in a stepped manner, for example, wherein each step can correspond to one or more filter pixels, that is to say that the different step heights represent an additional path that has to be traveled by the light in the optical medium upon reflection between the partly transmissive mirrors, which leads to a different phase offset of the interfering partial beams with respect to one another, such that the corresponding steps also transmit different wavelengths.

On the rear side of the filter array or else laterally with respect to the filter array, a transparent protective layer can be applied, for example, which firstly protects the filter array against mechanical influences. The protective layer can, in particular, be produced from silicon nitride or contain silicon nitride.

In the preferred development of the present invention, an antireflection layer can also be provided in order to be able to avoid disturbing light reflections that might corrupt the detection of the spectrometer. In general, an antireflection layer brings about destructive interference, such that the partial waves of the disturbing reflections mutually cancel one another out.

As transparent carrier in turn provision can be made of a glass plate, in particular, since this material advantageously not only can have the necessary transparency in the corresponding wavelength range of between 250 nm and 1150 nm, but also has a certain hardness and therefore imparts stability, wherein additionally the refractive index is well adaptable to the other components used in the spectrometer.

Correspondingly, a method according to the present invention for adjusting a filter array in relation to a sensor array for a spectrometer or for producing a corresponding spectrometer is distinguished by the fact that, in particular, the coordinates of the filter array in relation to the sensor array or the corresponding coordinate transformation of the filter array in relation to the sensor array are/is determined and saved in a nonvolatile memory, such that an assignment of the sensor pixels to individual filter pixels is made possible. The advantages already mentioned above are achievable by this measure. In particular, such an adjusting method can be used during the production of a spectrometer. Precisely when filter array and sensor array are manufactured as separate components which have to be joined together or positioned in relation to one another in the later production process, it is necessary to achieve an accurate positioning using comparatively simple means, since otherwise either the precision of the sensor would be detrimentally affected or else the spectrometer would become too expensive on account of manufacture.

BRIEF DESCRIPTION OF THE INVENTION

One exemplary embodiment of the present invention is illustrated in the drawings and is explained more specifically below with indication of further details and advantages.

DETAILED DESCRIPTION OF THE INVENTION

Figure 1:
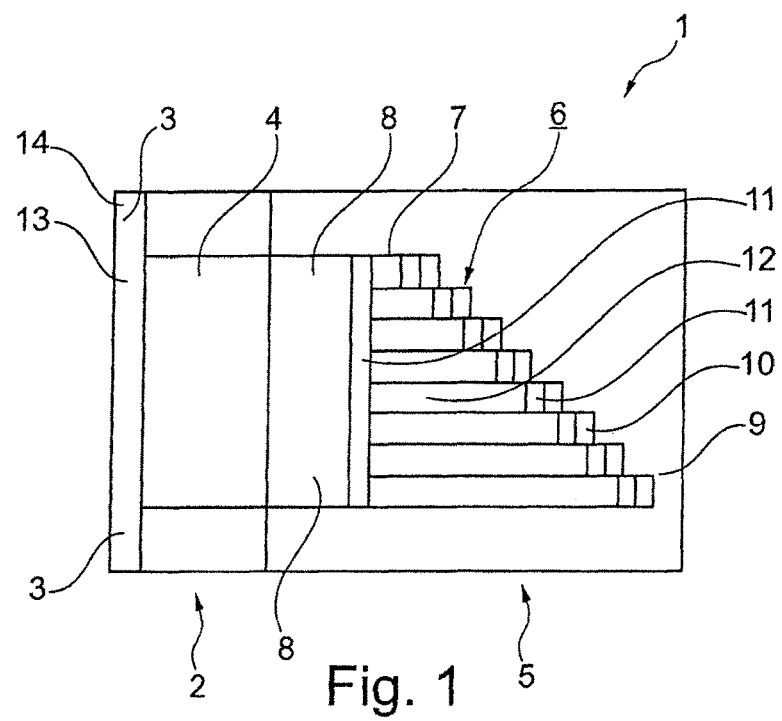
FIG. 1 shows a schematic section through a spectrometer according to the present invention.

FIG. 1 shows a spectrometer 1 comprising a semiconductor chip 2, which is divided into electronics 3 and a sensor array 4. The electronics 3 in turn serve inter alia for the evaluation of the signals obtained by the sensor array 4. The sensor array 4 is illuminated on the rear side, for which reason it is advantageous to arrange the electronics 3 on the front side in order that a shading of the detection region of the sensor array 4 does occur there. The filter array 5, arranged on the rear side of the sensor array 4, comprises as an essential constituent one or more Fabry-Pérot interferometers 6 (abbreviation: FPI), that perform the function of bandpass filters; this bandpass filter 6 is arranged in a stepwise manner, wherein each step 7 corresponds to a separate FPI construction for realizing an optical bandpass filter. At specific wavelengths, transmission maxima occur in an FPI, wherein the distance between them is referred to as free spectral range.

In addition, a glass plate 8 is arranged between sensor array 4 and Fabry-Pérot interferometer 6, said glass plate serving as carrier material for the Fabry-Pérot interferometer 6. It mechanically stabilizes the interferometer construction.

For the sensor array 4, it is possible to use in particular ToF (Time of flight) chips having two memories, respectively for short and for long exposure, such that an averaging, in particular also for suppressing background light, can also be performed by means of this measure.

A protective layer 9 composed of silicon nitride is situated in the outer region of the filter array 5, the core constituents of the filter array 5, in particular, the FPI 6 and also the glass plate 8, being embedded as it were into the protective layer. An antireflection layer 10 is in turn fitted on individual filter steps 7. The individual steps 7 are formed by a transparent layer 12, wherein the latter in turn is embedded between semitransparent layers 11 and wherein the semitransparent layers 11 in each case form the mirrors or partly transmissive mirrors of the interferometer.

Figure 2:
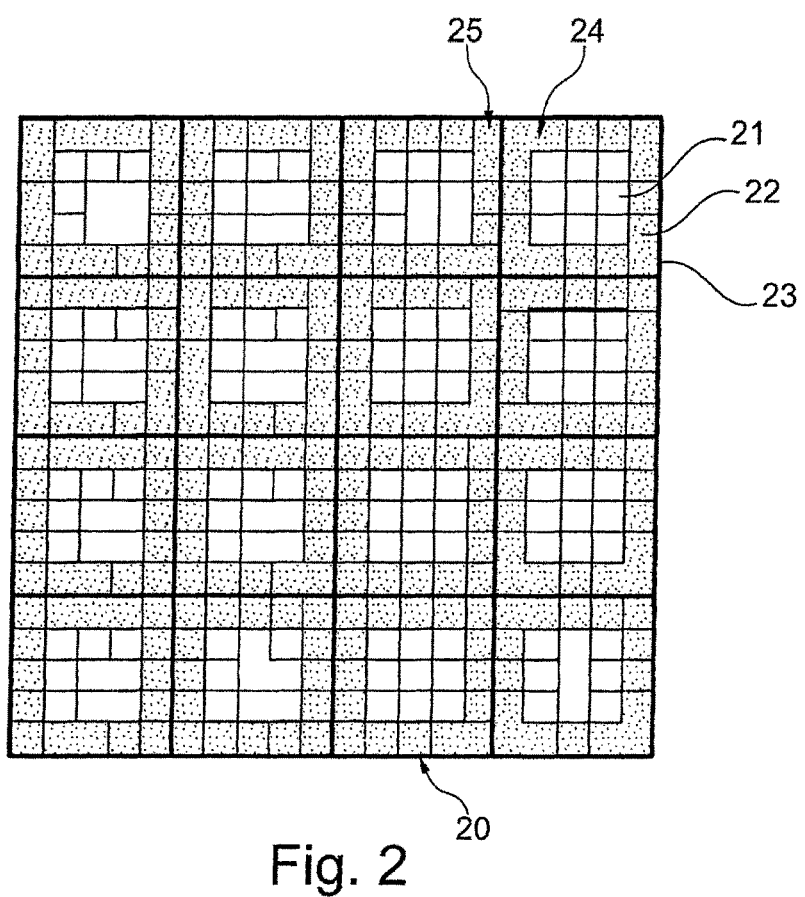
FIG. 2 shows a schematic illustration of the superimposition of sensor array and filter array.

FIG. 2 furthermore shows a matrix arrangement 20 of sensor pixels, that is to say a sensor array 20, wherein active sensor pixels 21 and inactive sensor pixels 22 are illustrated. The lines drawn in bold, each surrounding an area of 5×5 sensor pixels 21, 22, correspond in each case to a filter pixel 23. Within each filter pixel 23, an edge region 24 (one sensor pixel thick) is formed from inactive sensor pixels 22. The totality of the edges 24 composed of inactive sensor pixels 22 in turn forms a perforated grid diaphragm 25. The illustration according to FIG. 2 is based on an exact alignment of filter pixels 23 and sensor pixels 21, 22, wherein the alignments of corresponding rows and/or columns of filter pixels 23 and sensor pixels 21, 22 of the arrays in each case run parallel.

Figure 3:
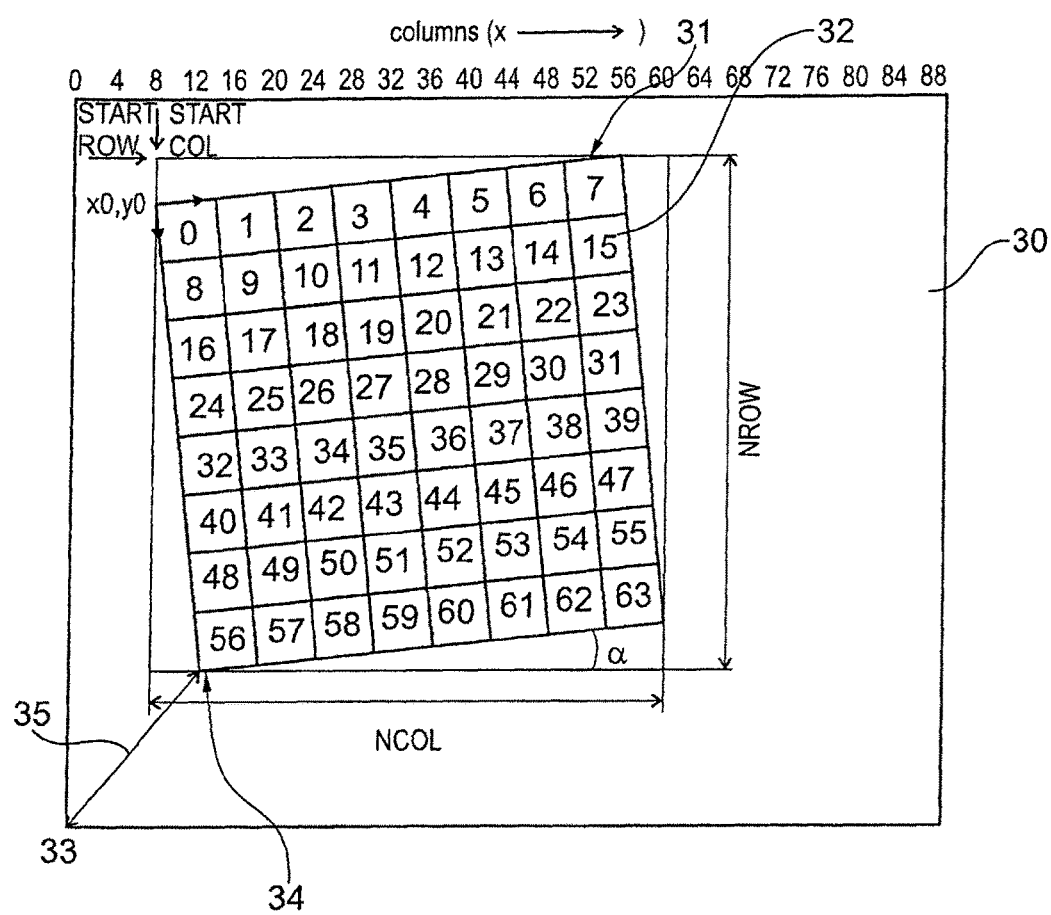
FIG. 3 shows a further schematic illustration of the superimposition of sensor array and filter array.

FIG. 3 shows a schematic illustration of a sensor array 30 and a filter array 31 having individual filter pixels 32 and clarifies that in general the origin 33 of the sensor array 30 can be offset relative to the origin 34 of the filter array 31 by an offset 35. In addition, the filter array 31 is rotated relative to the sensor array 30 by an angle α. The corresponding coordinate transformation can be stored in a memory that is part of the device 13 for identifying the sensor pixels covered by the filter array as part of the electronics 3, wherein the memory is embodied as a nonvolatile memory 14.

In all the exemplary embodiments of the present invention, the spectrometer comprises a semiconductor chip on its front side and a sensor array on the rear side of the semiconductor chip, the sensor array being designed for rear-side illumination. Moreover, provision is made of a filter array and a device for identifying the sensor pixels covered by the filter array, having a nonvolatile memory, wherein the coordinates of the filter array relative to the sensor array can be stored in the memory. As an alternative thereto, a coordinate transformation for determining the positioning of the filter array relative to the sensor array can also be used and stored in the memory. This measure constitutes a particularly effective method for performing adjustment of these two components, namely the filter array and the sensor array, relative to one another. In general, it is advantageous if the sensor pixels are designed to be as small as possible, since larger sensor pixels generally operate more slowly. Furthermore, it should be taken into consideration that the production of a filter array together with other components on one wafer is comparatively expensive. Therefore, in manufacture, it is often preferred to manufacture the filter array separately. In this case, however, an adjustment between sensor array and filter array is generally necessary. Precisely with the use of very small sensor pixels, such an adjustment may be extremely complex and expensive, however. It must likewise be taken into consideration that the filter array is displaced relative to the sensor array in general not by way of a pure offset or a simple translation, rather both components are regularly also rotated relative to one another.

REFERENCE SIGNS 1 spectrometer
2 semiconductor chip
3 electronics
4 sensor array
5 filter array
6 Fabry-Pérot interferometer
7 filter pixel/filter step
8 glass plate
9 protective layer
10 antireflection layer
11 semitransparent layer
12 transparent layer
13 device for identifying the sensor pixels covered by the filter array
14 nonvolatile memory
20 sensor array
21 active sensor pixels
22 inactive sensor pixels
23 filter pixels
24 edges
25 perforation grid diaphragm
30 sensor array
31 filter array
32 filter pixels
33 origin of the sensor array
34 origin of the filter array
35 offset
α rotation angle

The invention claimed is:

1. A spectrometer for recording a spectrum, comprising:
a semiconductor chip arranged on a front side of the spectrometer,
having a sensor array,
which is arranged on a rear side of the semiconductor chip,
which comprises a matrix arrangement of at least two sensor pixels,
wherein the sensor pixels are designed for detecting electromagnetic radiation,
wherein the sensor array is designed for rear-side illumination,
a filter array for filtering the radiation depending on the wavelength,
wherein the filter array comprises a matrix arrangement of at least two filter pixels,
wherein each filter pixel for the purpose of filtering forms a Fabry-Perot interferometer, and
wherein the filter array is arranged toward a rear side of the sensor array; and
a device for identifying sensor pixels covered by the filter array, having a nonvolatile memory, in which coordinates of the filter array in relation to the sensor array and/or coordinate transformation of the filter array in relation to the sensor array are/is stored in order to assign the sensor pixels to individual filter pixels on a basis of the stored coordinates and/or the coordinate transformation and/or in order to activate the individual filter pixels depending on which of the sensor pixels are covered by corresponding filter pixels, wherein the device for identifying the sensor pixels covered by the filter array is designed to deactivate, on the basis of the stored coordinates and/or the coordinate transformation, the sensor pixels which are situated in the coverage in each case at an edge of the individual filter pixels, and to form a perforated grid diaphragm such that filtered light of different filter pixels does not jointly influence one of the sensor pixels.

2. The spectrometer according to claim 1, wherein the filter array is arranged on the rear side of the sensor array.

3. The spectrometer according to claim 1, wherein the filter array is applied on a transparent carrier, wherein the transparent carrier is arranged on the rear side of the sensor array.

4. The spectrometer according to claim 3, wherein the transparent carrier is designed as a plate.

5. The spectrometer according to claim 1, wherein the device for identifying the sensor pixels covered by the filter array is designed to activate, on the basis of the stored coordinates and/or the coordinate transformation, at least one of the sensor pixels covered by the corresponding filter pixels.

6. The spectrometer according to claim 1, wherein the device for identifying the sensor pixels covered by the filter array comprises an electronic circuit designed to deactivate, on the basis of the stored coordinates and/or the coordinate transformation, the sensor pixels which are situated in the coverage in each case at the edge of the filter pixels, in order to form the perforated grid diaphragm such that the filtered light of the different filter pixels does not jointly influence the one of the sensor pixels.

7. The spectrometer according to claim 6, wherein the electronic circuit is designed to form the perforated grid diaphragm having an edge of deactivated sensor pixels, a width of said edge being smaller than at least one of a width or a diameter of a region of non-deactivated sensor pixels that is situated below the corresponding filter pixels, wherein an edge of the deactivated sensor pixels has a width of a sensor pixel.

8. The spectrometer according to claim 6, wherein the electronic circuit is part of the semiconductor chip.

9. The spectrometer according to claim 6, wherein the electronic circuit is fitted on a front side of the semiconductor chip.

10. The spectrometer according to claim 7, wherein the electronic circuit is designed not to read the deactivated sensor pixels.

11. The spectrometer according to claim 1, wherein the filter pixels cover a first area larger than a second area covered by the sensor pixels.

12. The spectrometer according to claim 1, wherein the filter array covers a smaller area than an area covered by the sensor array.

13. The spectrometer according to claim 1, wherein the filter pixels have an arrangement of partly transmissive mirrors which are arranged parallel to one another and which are separated from one another by a transparent layer.

14. The spectrometer according to claim 13, wherein the partly transmissive mirrors are at a different distance from one another by virtue of the transparent layers each having different thicknesses in order to achieve a different wavelength transmission in accordance with the thickness.

15. The spectrometer according to claim 1, wherein a transparent protective layer and/or an antireflective layer are/is fitted at least on a rear side of the filter array.

16. A method for adjusting a filter array in relation to a sensor array for a spectrometer and/or for producing a spectrometer for recording a spectrum, comprising:

arranging a semiconductor chip having a sensor array on a front side of the spectrometer, wherein the sensor array used is one such:
  is arranged on a rear side of the semiconductor chip,
  comprises a matrix arrangement of at least two sensor pixels, and
  is designed for rear-side illuminating,
  wherein the sensor pixels are designed for detecting electromagnetic radiation,
arranging a filter array for filtering the radiation depending on a wavelength on the sensor array, toward a rear side of the sensor array, wherein the filter array:
  comprises a matrix arrangement of at least two filter pixels,
  wherein each filter pixel for the purpose of filtering forms a Fabry-Perot interferometer,
determining coordinates of the filter array in relation to the sensor array and/or a coordinate transformation of the filter array in relation to the sensor array,
providing a non-volatile memory and storing the coordinates and/or the coordinate transformation therein,
assigning the sensor pixels to individual filter pixels and/or activating the individual filter pixels depending on which of the sensor pixels are covered by corresponding filter pixels, wherein sensor pixels are deactivated which, covered by the filter pixels, are situated in each case at an edge thereof, in order to form a perforated grid diaphragm, such that filtered light of different filter pixels does not jointly influence one of the sensor pixels.

17. The method according to claim 16, wherein a perforated grid diaphragm having the edge of deactivated sensor pixels is formed, a width of said edge being smaller than one of a width or a diameter of a region of the non-deactivated sensor pixels situated below the corresponding filter pixel, wherein the edge of the deactivated sensor pixels has a width of a sensor pixel.

18. The spectrometer according to claim 1, wherein the spectrometer is in a wavelength range of 250 ran to 1150 nm.

19. The spectrometer according to claim 4, wherein the plate is a glass plate.

20. The spectrometer according to claim 11, wherein the first area is 3 to 100,000 times larger than the second area.

21. The spectrometer according to claim 15, wherein the transparent protective layer is silicon nitride.

22. The method according to claim 16, wherein the spectrometer is in a wavelength range of 250 nm to 1150 nm.

* * * * *